United States Patent [19]
Krebs et al.

[11] Patent Number: 5,965,662
[45] Date of Patent: Oct. 12, 1999

[54] MOISTURE CURING POLYURETHANE HOT-MELT ADHESIVE

[75] Inventors: Michael Krebs; Roland Heider, both of Hilden; Klaus Schillings, Wuppertal, all of Germany; Michael Gansow, Elgin, Ill.

[73] Assignee: Henkel Kommanditgesellschaft auf Aktien, Duesseldorf, Germany

[21] Appl. No.: 08/966,667

[22] Filed: Nov. 10, 1997

Related U.S. Application Data

[63] Continuation of application No. 08/737,849, filed as application No. PCT/EP95/01873, May 17, 1995, abandoned.

[30] Foreign Application Priority Data

May 25, 1994 [DE] Germany .............. 44 18 177
Feb. 8, 1995 [DE] Germany ............. 195 04 007

[51] Int. Cl.[6] .............. C09J 175/06; C08L 75/06; C08G 18/10; C08G 18/40
[52] U.S. Cl. .............. 524/590; 528/61; 528/65; 528/66; 528/76; 528/83; 156/331.4
[58] Field of Search ............... 524/499, 590; 528/44, 61, 65, 66, 67, 76, 80, 83, 84, 85; 156/331.4

[56] References Cited

U.S. PATENT DOCUMENTS

| | | | |
|---|---|---|---|
| 4,585,819 | 4/1986 | Reischle et al. | 524/196 |
| 4,737,560 | 4/1988 | Heilmann et al. | 526/304 |
| 5,190,607 | 3/1993 | Werner et al. | 156/331.1 |
| 5,418,310 | 5/1995 | Kangas | 528/59 |
| 5,436,302 | 7/1995 | Stobbie, IV et al. | 528/67 |
| 5,536,805 | 7/1996 | Kangas | 528/67 |
| 5,558,941 | 9/1996 | Stobbie, IV et al. | 528/67 |
| 5,559,196 | 9/1996 | Stobbie, IV et al. | 528/67 |
| 5,574,114 | 11/1996 | Stobbie, IV et al. | 528/67 |
| 5,599,895 | 2/1997 | Heider | 528/76 |

FOREIGN PATENT DOCUMENTS

| | | |
|---|---|---|
| 0125008 | 11/1984 | European Pat. Off. . |
| 0223562 | 5/1987 | European Pat. Off. . |
| 0242676 | 10/1987 | European Pat. Off. . |
| 0340906 | 11/1989 | European Pat. Off. . |
| 0369607 | 5/1990 | European Pat. Off. . |
| 0381897 | 8/1990 | European Pat. Off. . |
| 0421154 | 4/1991 | European Pat. Off. . |
| 0455400 | 11/1991 | European Pat. Off. . |
| 0472278 | 2/1992 | European Pat. Off. . |
| 0511566 | 11/1992 | European Pat. Off. . |
| 2609266 | 9/1976 | Germany . |
| 3236313 | 4/1984 | Germany . |
| 4011060 | 5/1991 | Germany . |
| 3942616 | 6/1991 | Germany . |
| WO9412552 | 6/1994 | WIPO . |

*Primary Examiner*—Peter A. Szekely
*Attorney, Agent, or Firm*—Ernest G. Szoke; Wayne C. Jaeschke; Stephen D. Harper

[57] ABSTRACT

The hotmelt adhesive according to the invention contains
A) at least one polyurethane prepolymer of
  a) at least one polyisocyanate, more particularly toluene diisocyanate and/or MDI,
  b) at least one polyalkylene glycol in a concentration of more than 10% by weight, based on the hotmelt adhesive as a whole, more particularly polypropylene glycol,
  c) at least one polyester glycol, preferably at least two polyester glycols with different glass transition temperatures and
  d) at least one chain extender and
B) optionally additives, such as
  e) a resin, more particularly a hydrocarbon resin, and
  f) a stabilizer, more particularly toluene sulfonyl isocyanate.

The hotmelt adhesive preferably has a melt viscosity of 4 to 100 Pa•s at 170° C. The PU prepolymer has only one Tg in the DSC curve. The hotmelt adhesive is distinguished by high creep resistance and high early and ultimate strengths. Accordingly, it is mainly used in the shoe industry, more particular, in application machines designed for application in the shoe production line which does not contain any steam-operated preliminary crosslinking stage or a drying tunnel. The hotmelt adhesive is preferably produced by a single-stage process. The adhesive is particularly suitable for fibrous materials, such as leather and textiles.

70 Claims, No Drawings

MOISTURE CURING POLYURETHANE HOT-MELT ADHESIVE

This application is a continuation of, and claims priority from, application Ser. No. 08/737,849, filed Dec. 12, 1996, now abandoned, which is a national stage of PCT/EP95/01873 filed May 17, 1995.

FIELD OF THE INVENTION

This invention relates to a moisture-curing polyurethane hotmelt adhesive, to its production and to its use in the shoe industry.

DISCUSSION OF RELATED ART

A "moisture-curing polyurethane hotmelt adhesive" in the context of the present invention is a substantially solventless adhesive containing urethane groups which is solid at room temperature and which, after application in the form of a melt, sets not only physically by cooling, but also by chemical reaction of the isocyanate groups still present with moisture. It is only after this chemical curing, which is accompanied by an increase the size of the molecule, that the adhesive acquires its final properties.

Corresponding moisture-curing polyurethanes hotmelt adhesives are known for various substrates.

EP 0 421 154 describes a rapidly crystallizing, isocyanate-containing polyurethane system which is based on a polyester diol A with a melting point of 30 to 60° C. and a polyester diol B with a melting point of 65 to 150° C. and also a polyisocyanate D. It may also contain a diol C with a molecular weight of <400 as chain extender. The polyurethane system may be directly prepared from these components in a single stage, although its production may also comprise several stages. The polyurethane system obtained in this way is partly crystalline and is intended to be used as an assembly adhesive, but especially as a bookbinding adhesive.

DE 32 36 313 describes a hotmelt adhesive which consists of 20 to 90% by weight of a prepolymeric isocyanate and 5 to 50% by weight of a low molecular weight ketone resin and which may also contain 0 to 75% by weight of a thermoplastic polyurethane. The prepolymeric isocyanate is a reactive polyurethane prepolymer of
1. an aromatic diisocyanate and/or
2. a prepolymer of this isocyanate,
3. a polyether or a polyester containing OH groups and
4. a short-chain diol.
In the only Production Example, 74 g of tripropylene glycol are added as chain extender in addition to 516 g of a polyester diol. The prepolymer is prepared from the components in a single stage and has a viscosity of 50 to 40,000 Pa•s at 20° C. The hotmelt adhesive is suitable for the bonding of thermoplastics and thermosets, foams, painted surfaces, wood and wood-based materials, paper, leather, leathercloth, rubber, textiles, nonwoven materials and metals.

EP 0 340 906 describes a polyurethane hotmelt adhesive containing a mixture of at least two amorphous polyurethane prepolymers which provide the hotmelt adhesive with different glass transition temperatures. The glass transition temperatures are respectively above and below room temperature. The prepolymers are prepared from polyisocyanates and various diols, namely preferably polyester diols on the one hand and preferably polyester, polyether and other polymer diols on the other hand. The hotmelt adhesive is prepared either by mixing of the separately prepared prepolymers of by preparing the second prepolymer in the first. The hotmelt adhesives obtained are generally opaque at room temperature and, according to the Example, have a viscosity of 91 Pa•s at 130° C. The polyurethane hotmelt adhesive is used for bonding wood.

EP 0 369 607 describes a moisture-curing polyurethane hotmelt adhesive which contains at least two polyurethane prepolymers, the first prepolymer having a glass transition temperature above room temperature and the second prepolymer having a glass transition temperature below room temperature. The hotmelt adhesive is prepared from polyisocyanate and various diols, namely a polyether diol on the one hand and a polyether, polyester or polybutadienediol on the other hand. Example III contains 8.5% by weight of a polyester diol. The polyurethane hotmelt adhesive can be produced in one or more stages. It is generally transparent at room temperature and, according to Example I, has only one glass transition temperature. According to the Examples, it has a viscosity of 6.8 to 20 Pa•s at 130° C. The hotmelt adhesive is used for bonding wood, plastics and fabrics.

EP 0 472 278 describes an adhesive of a polyalkylene ether diol, a polyalkylene ether triol, a polyester polyol and an aliphatic isocyanate. The adhesive in question is a moisture-curing hotmelt adhesive for fabrics, wood, metal, leather and plastics.

EP 0 242 676 describes a process for the production of polyurethanes containing free isocyanate groups which are soluble in aromatic solvents and which are suitable as lacquer binders, being obtained by reaction of diisocyanates, macropolyols with a molecular weight of 500 to 10,000 and low molecular weight polyols with a molecular weight of 62 to 499. The low molecular weight polyols are highly branched diols such as, for example 2,2,4-trimethylpentane-1,3-diol, of which the hydroxyl groups may be etherified with one or two ethoxy or propoxy units. The polyurethanes are present in the form of a solution and are used as binders in moisture-curing one-component paints.

EP 0 511 566 describes a moisture-curing polyurethane hotmelt adhesive consisting of a) a polyol component liquid at room temperature with an average molecular weight of 500 to 5,000 and b) a polyol component crystalline at room temperature with a molecular weight of 500 to 10,000 and also a mixture of a polyisocyanate component with two NCO groups of different reactivity and a diisocyanate component with an NCO reactivity to hydroxy groups which is greater than that of the less reactive NCO groups of the polyisocyanate component containing two differently reactive NCO groups. The hotmelt adhesives are preferably used for bonding glass and glass/plastic composites.

EP 0 455 400 describes a moisture-curing polyurethane hotmelt adhesive consisting essentially of the following mixture:
a) 10 to 90 parts by weight of a first polyurethane prepolymer of polyhexamethylene adipate and
b) 90 to 10 parts by weight of a second polyurethane prepolymer of polytetramethylene glycol with a molecular weight Mn of at least 500.
This hotmelt adhesive is suitable for bonding certain synthetic polymers, wood, paper, leather, rubber, textiles, including nonwovens, and metals.

It is also known that moisture-curing polyurethane hotmelt adhesives can be used in the shoe industry. Thus, EP 0 125 008 describes a process for bonding a sole to a shoe upper. The polyurethane is prepared from a diisocyanate, a hydroxypolyester and a monofunctional reactant, the monofunctional reactant preferably being an aliphatic alcohol containing 4 to 14 carbon atoms and having a boiling point above 100° C. After application of the adhesive and before the actual bonding process involving heating and pressing, the adhesive is exposed to atmospheric moisture to extend the chains. This requires a time of 10 to 15 minutes at 80 to 110° C., moisture corresponding to a dew point of 40 to 60° C. and subsequent treatment in atmospheric moisture for 10 minutes to 18 hours.

Another process for fixing a sole to a shoe is described in EP 0 223 562. In this process, a moisture-curing solventless hotmelt adhesive is applied to the sole and/or to the shoe upper material and the adhesive coating is subsequently subjected to heat curing with moisture until, finally, the sole and the shoe upper material are pressed together.

DE 26 09 266 describes another process for bonding shoe soles to shoe uppers. The hotmelt adhesive is prepared by reaction of a diisocyanate with a polymeric polyol having a crystalline melting point of 40 to 90° C. After application, the hotmelt adhesive is contacted, for example, with water and the coating thus treated is subsequently pressed in a heat-softened state against a surface compatible therewith.

Finally, reference is made to earlier, but hitherto unpublished application PCT/EP93/03216. No chain extender is mentioned in this document.

Unfortunately, known moisture-curing polyurethane hotmelt adhesives have serious disadvantages when used in the shoe industry which, hitherto, have been an obstacle to their economic use on a large scale. A suitable adhesive should have the following properties:

The adhesive should not contain any toxic substances, especially solvents.

It should lend itself to application at a temperature which is not too high for the shoe materials.

The shoe materials to be joined are, above all, leather and rubber.

The adhesive should show suitable flow behavior and should have good wetting at the application temperature so that it can be applied without difficulty.

The adhesive bond should show adequate strength from the outset for subsequent processing. This applies in particular to its creep resistance and to its early strength, curing of the adhesive being required to take place in a reasonable time under ambient conditions. In other words, the adhesive should set in a few minutes to such an extent that its surface is no longer tacky so that, after cooling, coated soles and shoe uppers can readily be handled and stored without sticking together. The bond between the sole and the shoe upper should also be so strong from the outset that it does not separate either immediately or after storage under the effect of light, but constant forces. Accordingly, it must have adequate early strength and, above all, a high creep resistance within the cycle times of shoe production. Under the normal ambient conditions used for sole storage (20±5° C., >approx. 10% relative air humidity), the adhesive should ideally cure in 24 hours and in no more than 7 days.

The adhesive bond should be sufficiently strong and flexible in use. Flexibility at low temperatures is particularly important.

Accordingly, the problem addressed by the present invention was to provide a moisture-curing polyurethane hotmelt adhesive for the shoe industry that could be applied by machines integrated into the shoe production line which does not comprise any preliminary crosslinking with steam or a drying tunnel. To this end, the adhesives would have to develop in particular high creep resistance for adequate early strength and ultimate strength in a reasonable time. The other processing and performance properties of the adhesive would not affected. This applies in particular to factory hygiene requirements and to flexibility at low temperatures.

DESCRIPTION OF THE INVENTION

The solution provided by the invention is defined in the claims. It lies in a moisture-curing polyurethane hotmelt adhesive containing the following components:
A) at least one polyurethane prepolymer of
   a) at least one polyisocyanate,
   b) at least one polyalkylene glycol in a concentration of more than 10% by weight, based on the hotmelt adhesive as a whole,
   c) at least one polyester glycol and
   d) at least one chain extender and
B) optionally additives, such as
   e) a resin and
   f) a stabilizer.

A "polyurethane prepolymer" in the context of the present invention is an oligourethane containing isocyanate groups which may be regarded as an intermediate stage to the crosslinked polyurethanes. "At least" one polyurethane prepolymer means that the adhesive has at least one peak in the molecular weight distribution curve. They generally correspond in number to the number of separately prepared prepolymers from which the polyurethane hotmelt adhesive is obtained by purely physical mixing. Accordingly, the upper limit to the number of prepolymers is 3 for reasons of practicability.

A "polyisocyanate" in the context of the present invention is a low molecular weight compound containing two or three isocyanate groups. The diisocyanates are preferred, although they may contain up to about 10% by weight of trifunctional isocyanate. However, with increasing content of trifunctional isocyanate, unwanted crosslinking can be expected to occur both in the production and in the use of the hotmelt adhesive. Besides aliphatic and cycloaliphatic polyisocyanates, aromatic polyisocyanates above all are suitable for the purposes of the invention. Specific examples are toluene diisocyanate, diphenyl methane diisocyanate and mixtures thereof. Diphenyl methane diisocyanate is understood to be both 4,4'- and 2,4'-diphenyl methane diisocyanate and 2,2'-diphenyl methane diisocyanate and mixtures thereof. One or two different polyisocyanates are preferably used. Above all, a mixture of 2,4'- and 4,4'-diphenyl methane diisocyanate in a ratio of about 1:1 is used. Its mixture with the 2,4'-isomer influences inter alia the content of unreacted diisocyanate and also the thermal stability and the length of the reactivatability time of the adhesive film. The percentage content of the polyisocyanate in the hotmelt adhesive should be from 15 to 45% by weight and is preferably from 25 to 40% by weight.

A "polyalkylene glycol" is understood to be a linear polyether containing two OH groups. It preferably corresponds to the general formula $HO(-R-O)_m-H$, where R is a hydrocarbon radical containing 2 to 4 carbon atoms. Copolymers (both block polymers and statistical copolymers) are also suitable. Specific examples of polyalkylene glycols are polyethylene glycol, polytetramethylene glycol and, above all, polypropylene glycol ($R=-CH_2-CH(CH_3)-$). Preferably, only one type of polyalkylene glycol is used. However, mixtures of 2 to 3 polyalkylene glycols differing in their average molecular weight and/or in the nature of their structural elements may also be used.

The quantity of polyalkylene glycol (especially polypropylene glycol) used is at least 10% by weight, preferably from 10 to 70% by weight and more preferably from 15 to 35% by weight, based on the polyurethane hotmelt adhesive as a whole.

Polypropylene glycol above all is of interest. Its average molecular weight should generally be between 100 and 1,000, preferably between 250 and 700, more preferably between 350 and 600 and most preferably between 400 and 450 (by average molecular weight is meant the number average based on OH measurements, the molecular weight distribution optionally showing several peaks). Outside the range mentioned, there is a distinct reduction in the positive effects. These are inter alia the higher early strength (=strength before curing), the high creep resistance (=dimensional stability under the effect of light and constant forces) and the favorable flow properties at the application temperatures. In some cases, other polymer diols outside the preferred range, for example polyether ester diols (polyethers which, in addition to the ether groups, also contain ester groups in small measure) with the same molecular weight, may also be used for this purpose in the same quantity as polypropylene glycol.

A "polyester glycol" is understood to be a polyester containing two OH groups, preferably two terminal OH groups. They are prepared in known manner either from
a) aliphatic hydroxycarboxylic acids or from
b) aliphatic dicarboxylic acids containing 6 to 12 carbon atoms and diols, more particularly even-numbered diols, containing 4 to 8 carbon atoms.

Corresponding derivatives, for example lactones, methyl esters or anhydrides, may of course also be used. Specific starting products are butane-1,4-diol, hexane1,6-diol, adipic acid, azelaic acid, sebacic acid and lactone. The acid component may contain up to 25 mole-% of another acid, for example cyclohexane dicarboxylic acid, terephthalic acid and isophthalic acid. The glycol component may contain up to 15 mole-% of another diol, for example diethylene glycol, 1,4-cyclohexane dimethanol. Besides homopolymers of the above-mentioned structural units, copolyesters of the following structural units or derivatives thereof are particularly important:
1. adipic acid, isophthalic acid, phthalic acid and butanediol,
2. adipic acid, phthalic acid and hexanediol,
3. adipic acid, isophthalic acid, phthalic acid, ethylene glycol, neopentyl glycol and 3-hydroxy-2,2-dimethylpropyl-3-hydroxy-2,2-dimethyl propanoate and
4. adipic acid, phthalic acid, neopentyl glycol and ethylene glycol.

The preferred copolyester of adipic acid, isophthalic acid, phthalic acid and butanediol is partly crystalline and has a high viscosity. Accordingly, it leads to high early strengths. The copolyester of adipic acid, phthalic acid and hexanediol has a low glass transition temperature and, accordingly, leads to improved flexibility at low temperatures.

Accordingly, the polyester glycols are liquid or solid. Where they are solid, there are preferably amorphous or show low crystallinity. A mixture of partly crystalline and amorphous polyesters is preferably used. However, crystallinity is so lightly pronounced that its presence is not reflected in clouding in the final hotmelt adhesive. The melting point of the partly crystalline polyester is in the range from 40 to 120° C. and preferably in the range from 50 to 95° C. The melting point is the temperature at which the crystalline parts of the material melt. It is determined by differential thermoanalysis in the form of the main endothermal peak. A polyester glycol based on butanol, adipic acid, isophthalic acid and phthalic acid with a molecular weight of about 3,500 and a softening point of around 90° C. is preferably used as the partly crystalline polyester glycol.

The number average molecular weight of the polyester glycol (Mn) should be between 1,500 and 50,000 and is preferably between 2,500 and 6,000. It is calculated from the OH value. The molecular weight of the polyester glycol has a certain importance: with increasing molecular weight, extrusion of the hotmelt adhesive and its penetration into leather become more difficult whereas, with decreasing molecular weight, the hotmelt adhesive is not sufficiently firm at room temperature. The polyester glycols have a glass transition temperature (Tg) preferably in the range from −50° C. to +50° C. and more preferably in the range from −40° C. to +40° C. The glass transition temperature is determined by DSC measurement at a rate of 10° C./min. in the second run as the middle point of the stage.

Particularly suitable polyester glycols include those with a glass transition temperature of about −40° C. to 0° C., a viscosity of about 1,000 to about 30,000 mPa•s at 130° C. (Brookfield, RVDV II+Thermosel) and a hydroxyl value of around 20 to 60.

A mixture of 2 to 6 and, more particularly, 2 to 4 polyester glycols with different glass transition temperatures is preferably used. At least one polyester glycol should have a glass transition temperature in the range from −40 to 0° C., the percentage content of this polyester glycol being from 10 to 100% by weight and preferably from 50 to 90% by weight, based on the total quantity of polyester glycol.

As usual in polyurethane chemistry, "chain extenders" are understood to be low molecular weight compounds containing several, more particularly two, functional groups such as —OH, —SH, —COOH and/or amine. However, these compounds should be used in the production of the hotmelt adhesive. They may be added at any phase of the production cycle, for example in a one-pot process together with the other reactants or even after termination of the polyisocyanate/polyol reaction.

The molecular weights of the chain extenders are below 500 in the case of aromatic chain extenders, below 300 in the case of aliphatic chain extenders and preferably below 250 and, more preferably, below 200 in both cases. The following are specific examples of chain extenders:
aromatic chain extenders, such as 1,4-bis-(β-hydroxyethoxy)-benzene and ethoxylated and/or propoxylated bisphenol A (=2,2-(4,4'-dihydroxydiphenyl) dimethyl methane, terephthalic acid-bis-glycol ester, 1,4-di-(2-hydroxymethylmercapto)-2,3,5,6-tetrachlorobenzene;
typical saturated and unsaturated glycols, such as ethylene glycol, or condensates of ethylene glycol, butane-1,3-diol, butane-1,4-diol, butane-2,3-diol, propane-1,2-diol, propane-1,3-diol, neopentyl glycol, hexane-1,6-diol, bis-hydroxymethyl cyclohexane, succinic acid di-2-hydroxyethylamide, succinic acid di-N-methyl-(2-hydroxyethyl)-amide, 2-methylene propane-1,3-diol, 2-methylpropane-1,3-diol, thiodiglycol;
aliphatic, cycloaliphatic and aromatic diamines, such as ethylenediamine, hexamethylenediamine, 1,4-cyclohexylenediamine, piperazine, N-methyl propylenediamine, diaminodiphenyl sulfone, diaminodiphenyl ether, diaminodiphenyl dimethyl methane, 2,4-diamino-6-phenyl triazine, isophoronediamine, dimer fatty acid diamine, diaminodiphenyl methane or the isomers of phenylenediamine (but also carbohydrazides or hydrazides of dicarboxylic acids);
aminoalcohols, such as ethanolamine, propanolamine, butanolamine, N-methyl ethanolamine, N-methyl isopropanolamine; diethanolamine, triethanolamine and di- or tri-(alkanolamines) and alkoxylation products thereof;

aliphatic, cycloaliphatic, aromatic and heterocyclic mono- and diaminocarboxylic acids, such as glycine, 1- and 2-alanine, 6-aminocaproic acid, 4-aminobutyric acid, the isomeric mono- and diaminobenzoic acids, the isomeric mono- and diaminonaphthoic acids and water.

To establish a defined, low degree of branching, it is also possible to use chain extenders of higher functionality, for example trimethylol propane or glycerol, in small quantities.

The chain extenders are added in quantities of generally 0.1 to 16% by weight and preferably 1 to 8% by weight. At lower concentrations there is a distinct reduction in the effect whereas, at higher concentrations, unwanted changes in adhesion and flexibility can occur. Mixtures of chain extenders may of course also be used.

Above all, the addition of the chain extender improves creep resistance in the sole bonding phase immediately after pressing, i.e. before the adhesive has set. This enables the adhesive to withstand elastic recovery forces after the joining process. For example, the sole is deformed during pressing so that recovery forces act both on the seam and on the adhesive. If the early strength and creep resistance of the adhesive are inadequate, the seam opens so that a gap is formed. In shoe upper/sole constructions with a hidden seam, this fault is not immediately visible. In cases such as these, however, the bond is seriously weakened by the deformation and by the stress applied during curing. This disadvantage is prevented by the use of chain extenders.

The creep resistance of the hotmelt adhesive (=dimensional stability of the bond against irreversible deformation on prolonged exposure to gentle forces) can be improved by the addition of a hydrocarbon resin. Hydrocarbon resins are understood to be petroleum, coal tar and terpene resins. They generally have a molecular weight of less than 2,000. Preferred hydrocarbon resins are modified aromatic hydrocarbon resins, terpene resins such as, for example, α- and β-pinene polymers, low molecular weight polystyrenes, such as for example poly-α-methyl styrene, colophony esters and coumarone/indene resins. These substances do of course also act as tackifiers. Their percentage content by weight in the hotmelt adhesive is from 0 to 20% by weight and, more particularly, from 3 to 10% by weight.

Stabilizers are additives which are intended to keep the physical properties, more particularly melt viscosity and color, substantially constant. At least one of the following substances mentioned by way of example may be used for this purpose: phosphoric acid, phosphorous acid and toluene sulfonyl isocyanate. It is best to use from 0 to 0.5% by weight and, more particularly, from 0.01 to 0.1% by weight of toluene sulfonyl isocyanate as stabilizer.

The curing reaction may be accelerated by addition of known polyurethane catalysts, for example diorganotin compounds, such as dibutyl tin dilaurate for example, or a mercaptotin compound. The catalyst is used in a quantity of 0 to 0.15% by weight and, more particularly, in a quantity of 0.05 to 0.1% by weight, based on the weight of the prepolymer.

The hotmelt adhesive according to the invention is made up of the above components, preferably as follows:
a) 15 to 45% by weight of polyisocyanate,
b) 10 to 70% by weight and, more particularly, 15 to 35% by weight of polyalkylene glycol,
c) 5 to 65% by weight and, more particularly, 20 to 40% by weight of polyester glycol,
d) 0.1 to 16% by weight and preferably 1 to 8% by weight of chain extenders,
e) 0 to 20% by weight and, more particularly, 3 to 10% by weight of resin and
f) 0 to 0.5% by weight and, more particularly, 0.01 to 0.1% by weight of stabilizer.

However, it is not only the percentages by weight of the individual components which are important, their ratios by weight to one another are also important. Thus, the ratio of the reactive NCO and OH groups to one another should be 1.05:1 to 2:1 and preferably 1.10:1 to 1.5:1. The NCO:OH ratio to be selected for a specific adhesive composition should be selected so that the hotmelt adhesive has a useful molecular weight, i.e. it should be high enough to produce high early strength, but on the other hand low enough to ensure that viscosity (even in the absence of solvent) is sufficiently low both during production and in use. In addition, the hotmelt adhesive should contain at least 0.5 to 3 g and, preferably, 1.0 to 2 g of free NCO groups per 100 g of hotmelt adhesive to ensure adequate curing with moisture. The NCO content is determined by titration.

The melt viscosity of the polyurethane hotmelt adhesive according to the invention is generally in the range from 4 to 100 Pas and preferably in the range from 10 to 40 Pas. The melt viscosity is determined at 170° C. using a Brookfield viscosimeter by preheating the sample for 15 minutes at 170° C. and then reading off the value.

In addition, the nature and quantity of the individual should also be selected in such a way that they are compatible. An indication of this may be seen in the fact that the polyurethane prepolymer preferably has only one glass transition temperature (Tg) in the DSC curve. The second run carried out at a heating rate of 10° C./minute is crucial in this regard.

The polyurethane prepolymer according to the invention may be prepared both in a single stage and in several stages. In the multistage process, for example, the polyisocyanate is first separately prepared with the polyalkylene glycol, the chain extender and the polyester glycol, after which the reaction products are mixed together. The polyisocyanate may also be initially reacted solely with the polyalkylene glycol, the chain extender or the polyester glycol and the reaction product obtained subsequently reacted in the presence of all the other reactants.

However, the polyurethane prepolymer according to the invention is preferably produced by a single-stage process. In this process, the polyester and polyalkylene glycols and the chain extender are first mixed and then dehydrated in vacuo for 60 minutes at 130° C. The polyisocyanate is then added. The reaction mixture is reheated to 150–180° C. In the absence of a catalyst, it generally takes about 60 minutes to complete the reaction in vacuo so that no more OH groups can be detected.

Unless the required additives have been introduced during the formation of the polyurethane prepolymer, they have to be added and homogenized at this stage.

Since the polyurethane prepolymer contains reactive NCO groups, the polyurethane hotmelt adhesive is sensitive to moisture from the air. Accordingly, it has to be protected against moisture in storage. To this end, it is best stored in a sealed, dry and moisture-proof container of aluminium, tin or composite films.

The hotmelt adhesive according to the invention is essentially distinguished by the following valuable properties:
It does not contain any solvent. The concentration of the unreacted MDI is less than 2.0% and, more particularly, less than 1.0% by weight.
It is stable in storage, i.e. no separation takes place. It is relatively stable at the application temperature of, for example, 170° C., i.e. the melt viscosity varies over a range of ±max. one third and preferably one fifth of the starting value over a period of 4 hours.

It can readily be applied as a free-flowing melt at 110 to 180° C.

Good bonding results are obtained, even with leathers having a high fat content. In some cases, pretreatment, for example with a primer, may be unnecessary.

Both rubber and leather are sufficiently wetted and the hotmelt adhesive even penetrates relatively deeply into fibrous materials.

Before setting, sufficient time remains for positioning the parts to be joined relative to one another.

During cooling under the ambient conditions, bonds with high early strength and high creep resistance are immediately formed. In addition, the layers are not tacky after cooling.

Acceptable strengths are achieved over the usual storage times for semi-finished shoes. In addition, the bonds are flexible even at low temperatures.

The bond can be transparent, i.e. non-cloudy.

After curing, the bond is highly resistant to water, heat and mechanical stressing.

The strengths are so high that the cycle times normally used in the shoe industry can be maintained.

By virtue of these positive properties, the hotmelt adhesives according to the invention are suitable for the bonding of many substrates, more particularly fibrous and/or open pore materials, such as wood, leather or textiles, for example fabrics or nonwovens.

Particularly good bonding results are obtained when the hotmelt adhesive is applied to preheated substrates at a temperature of 150° C. to 200° C. and preferably at a temperature of 170° C. to 190° C. The surface of the substrate should have a temperature of 40 to 180° C. and, more particularly, 60 to 100° C. If, for example, the adhesive is applied at 180° C. to leather preheated to 80° C., peel strengths of 5 to 30 N/mm are measured after curing of the adhesive. If the adhesive is applied at 180° C. to leather at room temperature, the peel strengths are only 1 to 5 N/mm, depending on the strength and fiber structure of the leather.

The same positive effect is obtained if the substrate already coated with adhesive is subsequently heated to 80 to 180° C. and preferably to a temperature of 120 to 150° C. or if the material is heated during application of the adhesive.

Suitable heat sources are, in particular, infrared radiation, microwaves, contact heat or hot air and steam.

The positive effect is achieved by the relatively deep penetration of the hotmelt adhesive into the open-pore material and by the compacting of the material by the adhesive after curing. In addition, in this method of using the adhesive, the hotmelt adhesive can react with free —OH– or —NH$_2$— groups in the fibrous materials, such as textile, and with the water present therein during the heating process, thus leading to chemical bonding in the material.

Accordingly, the adhesives according to the invention are eminently suitable for use in the shoe industry, more particularly in application machines designed for integration in the shoe production line which does not have any steam-operated preliminary crosslinking stage or drying tunnel.

By "shoe" is meant the outer foot covering, i.e. not only the saleable end product, but also the intermediate products therefor. By "sole" is meant the entire shoe tread surface, including the heels.

The hotmelt adhesives according to the invention may be used with particular advantage for fixing soles to shoe uppers and, in addition, for fixing substrates under tension and for bonding leather. Accordingly, the present invention also relates to the use of the adhesives according to the invention for fixing soles to shoe upper material, more particularly of leather, in the following working steps:

1. optionally pretreatment of the sole and/or the shoe upper material,
2. application of a layer of the hotmelt adhesive at 110 to 180° C. to at least one of the surfaces to be joined; the other surface either does not have to contain any adhesive or may contain a solvent-based adhesive or dispersion adhesive,
3. pressing the surfaces to be joined together, pressures lower by a factor of 2 to 4 by comparison with the contact adhesives normally used being sufficient, and
4. optionally cooling the surface to be bonded during or after pressing.

Before the hotmelt adhesive according to the invention is applied, the sole and the shoe upper material are best pretreated. This is done by known methods, for example by roughening, wiping with solvents or priming with a primer or halogenation of certain rubber components.

The hotmelt adhesive preferably contains no solvent on application.

The adhesive is preferably applied by machine in a thickness of 0.05 to 0.7 mm. After a layer of the hotmelt adhesive has been applied and before the surfaces to be bonded are pressed together, the hotmelt adhesive may even be cooled and the material thus prepared may be stored as long as curing is avoided. Before pressing, the sample has to be reactivated by heating to a temperature of 40 to 180° C.

Curing may be carried out under various conditions. In particular, the adhesive is cured by exposure to moisture from the air and/or the substrates. To this end, the relative air humidity should be more than 25% at 20° C. Under these conditions, curing lasts at least 24 hours. However, the ambient conditions may even vary, for example by ±5° C. at 20° C. However, the relative air humidity should not be less than 10% if the adhesive is to cure over a period of 3 to 7 days. The moisture may even be applied in accordance with DE 39 42 616.

Where the hotmelt adhesive according to the invention is used in the shoe industry, the following advantages are achieved:

It provides for a system which may readily be integrated in the production line, i.e. without delaying the production cycle and without any need for additional outlay on machines and energy.

By virtue of its high creep resistance and early strength and the unnecessary drying times, it provides for distinctly higher productivity.

Bond strength in the bonding of leather is considerably higher than before.

In some cases, it is sufficient to apply the adhesive to one side of the upper material, for example in the bonding of PU soles.

Accordingly, the present invention also relates to shoes produced using the adhesive according to the invention.

The invention is illustrated by the following Examples.

EXAMPLE 1

A) Starting materials:

Polyester A is a partly crystalline copolyester glycol of isophthalic acid, butanediol, phthalic acid dimethyl ester and adipic acid. Polyester A has a molecular weight of around 3,500, a hydroxyl value of 27 to 34, as determined in accordance with DIN 53240, a glass transition temperature of around −20° C., as determined by DSC, and a viscosity of around 30,000 mPa•s at 100° C. and around 5,000 mPa•s at 130° C. (as determined with a Brookfield LVT4 viscosimeter).

Polyester B is a partly crystalline copolyester glycol or phthalic acid dimethyl ester, adipic acid and hexanediol. It has a molecular weight of around 3,500, a hydroxyl value of 27 to 34, as determined in accordance with DIN 53240, a glass transition temperature of around −40° C., as determined by DSC, and a viscosity of around 3,000 mPa·s at 130° C., as determined with a Brookfield LVT4 viscosimeter.

Polyester C is a solid amorphous copolyester glycol of isophthalic acid, neopentyl glycol, ethylene glycol, adipic acid, phthalic acid and 3-hydroxy-2,2-dimethylpropyl-3-hydroxy-2,2-dimethyl propanoate. It has a molecular weight of around 3,500, a hydroxyl value of 31 to 39, as determined in accordance with DIN 53240, a glass transition temperature of around +30° C., as determined by DSC, and a viscosity of around 30,000 mPa·s at 130° C., as determined with a Brookfield LVT4 viscosimeter.

Polyester I is a solid, amorphous copolyester glycol with a molecular weight of around 3,500, a hydroxyl value of 27 to 34, as determined in accordance with DIN 53240, a glass transition temperature of around 20° C., as determined by DSC, and a viscosity at 130° C. of around 7,000 mPa·s, as determined with a Brookfield LVT4 viscosimeter. The polyester materials are commercially available through Hüls AG, Troisdorf, Germany.

The polypropylene glycol has a molecular weight of around 425 and is obtainable from Miles Inc., Pittsburgh, Pa.

The isomer mixture of diphenyl methane-2,4'-diisocyanate and diphenyl methane-4,4'-diisocyanate (MDI) is obtainable from Miles Inc., Pittsburgh.

B) Production

In the following Example, the polyurethane adhesive was prepared by dehydrating the quantities of butane-1,4-diol, polyester glycol mixture and polypropylene glycol shown in vacuo for about 60 minutes at a temperature of 130° C. The quantity of diphenyl methane isocyanate (MDI) shown was then added to the mixture, followed by reaction in vacuo for about 60 minutes at a temperature of around 170° C. After the reaction, the prepolymer was placed in a moisture-proof container.

Composition:
1150 g polypropylene glycol
92 g butane-1,4-diol
575 g polyester diol A
115 g polyester diol B
115 g polyester diol C
115 g polyester diol I
1244 g MDI isomer mixture C) Viscosity measurement Viscosity was measured with a Brookfield Thermocell viscosimeter. After a tube containing the polyurethane melt had been heated for 15 minutes to the temperatures shown, the value was read off. The stability of the polyurethane melt was determined by measuring the increase in viscosity over a period of 2 hours at 170° C. A value of 18.3 Pa·s was obtained after 0 minute, a value of 10.6 Pa·s after 30 minutes, a value of 10.8 Pa·s after 60 minutes and a value of 11.5 Pa·s after 120 minutes.

What is claimed is:

1. A moisture-curing polyurethane hotmelt adhesive, which comprises at least one polyurethane prepolymer which is the reaction product of:
   at least one polyisocyanate;
   at least one polypropylene glycol which has a molecular weight of about 100 to about 1,000 in a concentration of more than 10% by weight, based on the hotmelt adhesive as a whole;
   at least one polyester glycol; and
   at least one chain extender.

2. The moisture-curing polyurethane hotmelt adhesive of claim 1, wherein the polypropylene glycol has a molecular weight of about 250 to about 700.

3. The moisture-curing polyurethane hotmelt adhesive of claim 1, wherein the polypropylene glycol has a molecular weight of about 350 to about 600.

4. The moisture-curing polyurethane hotmelt adhesive of claim 1, wherein at least one polyester glycol has a glass transition temperature, as measured by DSC, of about −40 to about 0° C.

5. The moisture-curing polyurethane hotmelt adhesive of claim 1, comprising a mixture of at least two polyester glycols with different glass transition temperatures, as measured by DSC.

6. The moisture-curing polyurethane hotmelt adhesive of claim 5, wherein the glass transition temperatures of the polyester glycols are in the range from about −50 to about +50° C., one glass transition temperature being below about 0° C. and the other above about 0° C.

7. The moisture-curing polyurethane hotmelt adhesive of claim 5, wherein the glass transition temperatures of the polyester glycols are in the range from about −40 to about +40° C., one glass transition temperature being below about 0° C. and the other above about 0° C.

8. A moisture-curing polyurethane hotmelt adhesive comprising at least one polyurethane prepolymer which is the reaction product of:
   about 15 to about 45% by weight of at least one aromatic diisocyanate;
   about 10 to about 70% by weight of at least one polypropylene glycol that has a molecular weight of about 100 to about 1,000;
   about 5 to about 65% by weight of a mixture of at least two polyester glycols with different glass transition temperatures, as measured by DSC; and
   about 0.1 to about 16% by weight of diol chain extender, said weights being based on the hotmelt adhesive as a whole.

9. A moisture-curing polyurethane hotmelt adhesive comprising
   (a) at least one polyurethane prepolymer which is the reaction product of:
      (i) about 25 to about 40% by weight of at least one aromatic diisocyanate selected from the group consisting of toluene diisocyanate, 4,4'-diphenyl methane diisocyanate and 2,4'-diphenyl methane diisocyanate and mixtures thereof;
      (ii) about 15 to about 35% by weight of at least one polypropylene glycol that has a molecular weight of about 250 to about 700;
      (iii) about 20 to about 40% by weight of a mixture of at least two polyester glycols with different glass transition temperatures, as measured by DSC, wherein the glass transition temperatures of the polyester mixture are in the range from about −50 to about +50° C., one glass transition temperature being below about 0° C. and the other above about 0° C.; and
      (iv) about 1 to about 8% by weight of at least one diol chain extender;
   (b) about 3 to about 10% by weight of a hydrocarbon resin; and
   (c) about 0.01 to about 0.1% by weight of stabilizer; said weights being based on the hotmelt adhesive as a whole.

10. A moisture-curing polyurethane hotmelt adhesive, which comprises:

(a) at least one polyurethane prepolymer comprising the reaction product of:
  (i) at least one polyisocyanate;
  (ii) at least one polyalkylene glycol in a concentration of more than 10% by weight, based on the hotmelt adhesive as a whole;
  (iii) at least one polyester glycol; and
  (iv) at least one chain extender; and
(b) at least one hydrocarbon resin.

11. The moisture-curing polyurethane hotmelt adhesive of claim 10, wherein at least one hydrocarbon resin is selected from the group consisting of modified aromatic hydrocarbon resins, terpene hydrocarbon resins, and mixtures thereof.

12. The moisture-curing polyurethane hotmelt adhesive of claim 10, comprising about 1 to about 20% by weight hydrocarbon resin, based on the hotmelt adhesive as a whole.

13. The moisture-curing polyurethane hotmelt adhesive of claim 10, comprising about 3 to about 10% by weight hydrocarbon resin, based on the hotmelt adhesive as a whole.

14. The moisture-curing polyurethane hotmelt adhesive of claim 10 additionally comprising at least one stabilizer.

15. The moisture-curing polyurethane hotmelt adhesive of claim 10, wherein at least one polyalkylene glycol is a polypropylene glycol having a molecular weight of about 100 to about 1,000.

16. The moisture-curing polyurethane hotmelt adhesive of claim 10, wherein at least one polyester glycol has a glass transition temperature, as measured by DSC, of about −40 to about 0° C.

17. The moisture-curing polyurethane hotmelt adhesive of claim 10, comprising at least two polyester glycols with different glass transition temperatures, as measured by DSC.

18. The moisture-curing polyurethane hotmelt adhesive of claim 17, wherein the glass transition temperatures of the two polyester glycols are in the range from about −50 to about +50° C., one glass transition temperature being below about 0° and the other above about 0° C.

19. The moisture-curing polyurethane hotmelt adhesive of claim 10, wherein the number average molecular weight of the polyester glycol is between about 2,500 and about 6,000 and the polyester glycol is selected from the group consisting of liquid, amorphous, partly crystalline polyester glycols and mixtures thereof.

20. The moisture-curing polyurethane hotmelt adhesive of claim 10, wherein at least one chain extender is a compound containing at least two reactive functional groups selected from the group consisting of —OH, —SH, amine and mixtures thereof, which has a molecular weight below 500 in the case of an aromatic chain extender and a molecular weight below 300 in the case of an aliphatic chain extender.

21. The moisture-curing polyurethane hotmelt adhesive of claim 10, wherein at least one chain extender is a diol.

22. The moisture-curing polyurethane hotmelt adhesive of claim 10, wherein the polyurethane prepolymer has a single glass transition temperature, as measured by DSC.

23. The moisture-curing polyurethane hotmelt adhesive of claim 10, having a melt viscosity of about 4 to about 100 Pa.s at 170° C.

24. A moisture-curing polyurethane hotmelt adhesive, which comprises at least one polyurethane prepolymer comprising the reaction product of:
  (i) at least one polyisocyanate;
  (ii) at least one polypropylene glycol having a molecular weight of about 100 to about 1,000 in a concentration of more than 10% by weight, based on the hotmelt adhesive as a whole;
  (iii) at least one polyester glycol; and
  (iv) at least one chain extender.

25. The moisture-curing polyurethane hotmelt adhesive of claim 24 additionally comprising at least one stabilizer.

26. The moisture-curing polyurethane hotmelt adhesive of claim 24 additionally comprising at least one resin.

27. The moisture-curing polyurethane hotmelt adhesive of claim 24, comprising about 10 to about 70% by weight polypropylene glycol, based on the hotmelt adhesive as a whole.

28. The moisture-curing polyurethane hotmelt adhesive of claim 24, comprising about 15 to about 35% by weight polypropylene glycol, based on the hotmelt adhesive as a whole.

29. The moisture-curing polyurethane hotmelt adhesive of claim 24, wherein the polyisocyanate is an aromatic diisocyanate.

30. The moisture-curing polyurethane hotmelt adhesive of claim 24, wherein the polypropylene glycol has a molecular weight of about 250 to about 700.

31. The moisture-curing polyurethane hotmelt adhesive of claim 24, wherein the polypropylene glycol has a molecular weight of about 350 to about 600.

32. The moisture-curing polyurethane hotmelt adhesive of claim 24, wherein at least one polyester glycol has a glass transition temperature, as measured by DSC, of about −40 to about 0° C.

33. The moisture-curing polyurethane hotmelt adhesive of claim 24, comprising a mixture of at least two polyester glycols with different glass transition temperatures, as measured by DSC.

34. The moisture-curing polyurethane hotmelt adhesive of claim 33, wherein the glass transition temperatures of the polyester glycols are in the range from about −50 to about +50° C., one glass transition temperature being below about 0° and the other above about 0° C.

35. The moisture-curing polyurethane hotmelt adhesive of claim 24, wherein the number average molecular weight of at least one polyester glycol is between about 2,500 and about 6,000 and at least one polyester glycol is selected from the group consisting of liquid, amorphous, partly crystalline polyester glycols and mixtures thereof.

36. The moisture-curing polyurethane hotmelt adhesive of claim 24, wherein at least one chain extender is a compound containing at least two reactive functional groups selected from the group consisting of —OH, —SH, amine and mixtures thereof, which has a molecular weight below 500 in the case of an aromatic chain extender and a molecular weight below 300 in the case of an aliphatic chain extender.

37. The moisture-curing polyurethane hotmelt adhesive of claim 24, wherein at least one chain extender is a diol.

38. The moisture-curing polyurethane hotmelt adhesive of claim 24, wherein the polyurethane prepolymer has a single glass transition temperature, as measured by DSC.

39. The moisture-curing polyurethane hotmelt adhesive of claim 24, having a melt viscosity of about 4 to about 100 Pa.s at 170° C.

40. A moisture-curing polyurethane hotmelt adhesive, which comprises at least one polyurethane prepolymer comprising the reaction product of:
  (i) at least one polyisocyanate;
  (ii) at least one polyalkylene glycol in a concentration of more than 10% by weight, based on the hotmelt adhesive as a whole;
  (iii) at least one polyester glycol; and
  (iv) at least one aromatic chain extender having a molecular weight below about 500.

41. The moisture-curing polyurethane hotmelt adhesive of claim 40 additionally comprising at least one resin.

42. The moisture-curing polyurethane hotmelt adhesive of claim 40 additionally comprising at least one stabilizer.

43. The moisture-curing polyurethane hotmelt adhesive of claim 40 wherein the aromatic chain extender is a diol.

44. The moisture-curing polyurethane hotmelt adhesive of claim 40 wherein the aromatic chain extender has a molecular weight below 250.

45. The moisture-curing polyurethane hotmelt adhesive of claim 40, comprising about 0.1 to about 16% by weight of aromatic chain extender, based on the hotmelt adhesive as a whole.

46. The moisture-curing polyurethane hotmelt adhesive of claim 40, comprising about 1 to about 8% by weight of aromatic chain extender, based on the hotmelt adhesive as a whole.

47. The moisture-curing polyurethane hotmelt adhesive of claim 40, wherein the polyisocyanate is an aromatic diisocyanate.

48. The moisture-curing polyurethane hotmelt adhesive of claim 40, wherein the at least one polyalkylene glycol is a polypropylene glycol which has a molecular weight of about 100 to about 1,000.

49. The moisture-curing polyurethane hotmelt adhesive of claim 40, wherein at least one polyester glycol has a glass transition temperature, as measured by DSC, at about −40 to about 0° C.

50. The moisture-curing polyurethane hotmelt adhesive of claim 40, comprising a mixture of at least two polyester glycols with different glass transition temperatures, as measured by DSC.

51. The moisture-curing polyurethane hotmelt adhesive of claim 50, wherein the glass transition temperatures of the polyester glycols are in the range from about −50 to about +50° C., one glass transition temperature being below about 0° and the other above about 0° C.

52. The moisture-curing polyurethane hotmelt adhesive of claim 50, wherein the number average molecular weight of at least one polyester glycol is between about 2,500 and about 6,000 and at least one polyester glycol is selected from the group consisting of liquid, amorphous, partly crystalline polyester glycols and mixtures thereof.

53. The moisture-curing polyurethane hotmelt adhesive of claim 40, wherein the polyurethane prepolymer has a single glass transition temperature, as measured by DSC.

54. The moisture-curing polyurethane hotmelt adhesive of claim 40, having a melt viscosity of about 4 to about 100 Pa.s at 170° C.

55. A moisture-curing polyurethane hotmelt adhesive, which comprises:
   (a) at least one polyurethane prepolymer comprising the reaction product of:
      (i) at least one polyisocyanate;
      (ii) at least one polyalkylene glycol in a concentration of more than 10% by weight, based on the hotmelt adhesive as a whole;
      (iii) at least one polyester glycol; and
      (iv) at least one chain extender; and
   (b) at least one stabilizer selected from the group consisting of phosphoric acid, phosphorous acid and toluene sulfonyl isocyanate.

56. The moisture-curing polyurethane hotmelt adhesive of claim 55, comprising about 0.01 to about 0.5% by weight of stabilizer, said weight being based on the hotmelt adhesive as a whole.

57. The moisture-curing polyurethane hotmelt adhesive of claim 55, comprising about 0.01 to about 0. 1% by weight of stabilizer, said weight being based on the hotmelt adhesive as a whole.

58. The moisture-curing polyurethane hotmelt adhesive of claim 55, wherein the polyisocyanate is an aromatic diisocyanate.

59. The moisture-curing polyurethane hotmelt adhesive of claim 55, wherein at least one polyalkylene glycol is a polypropylene glycol which has a molecular weight of about 100 to about 1,000.

60. The moisture-curing polyurethane hotmelt adhesive of claim 55, wherein at least one polyester glycol has a glass transition temperature, as measured by DSC, of about −40 to about 0° C.

61. The moisture-curing polyurethane hotmelt adhesive of claim 55, comprising a mixture of at least two polyester glycols with different glass transition temperatures, as measured by DSC.

62. The moisture-curing polyurethane hotmelt adhesive of claim 61, wherein the glass transition temperatures of the polyester glycols are in the range from about −50 to about +50° C., one glass transition temperature being below about 0° and the other above about 0° C.

63. The moisture-curing polyurethane hotmelt adhesive of claim 55, wherein the number average molecular weight of at least one polyester glycol is between about 2,500 and about 6,000 and at least one polyester glycol is selected from the group consisting of liquid, amorphous, partly crystalline polyester glycols and mixtures thereof.

64. The moisture-curing polyurethane hotmelt adhesive of claim 55, wherein at least one chain extender is a compound containing at least two reactive functional groups selected from the group consisting of —OH, —SH, amine and mixtures thereof, which has a molecular weight below 500 in the case of an aromatic chain extender and a molecular weight below 300 in the case of an aliphatic chain extender.

65. The moisture-curing polyurethane hotmelt adhesive of claim 55, wherein the polyurethane prepolymer has a single glass transition temperature, as measured by DSC.

66. The moisture-curing polyurethane hotmelt adhesive of claim 55, having a melt viscosity of about 4 to about 100 Pa.s at 170° C.

67. A process for bonding a first substrate to a second substrate comprising using the moisture-curing polyurethane hotmelt adhesive of claim 10, claim 24, claim 40, or claim 55 to bond said first substrate and second substrate.

68. The process of claim 67 wherein one or both of the first substrate and second substrate are open-pore materials.

69. The process of claim 68 wherein the open-pore materials are selected from the group consisting of wood, leather and textiles.

70. The process of claim 69 wherein the hotmelt adhesive is applied to at least one surface of the first substrate or second substrate and wherein said surface is heated before, during or after application of the hotmelt adhesive to said surface.

* * * * *